Figure 1:
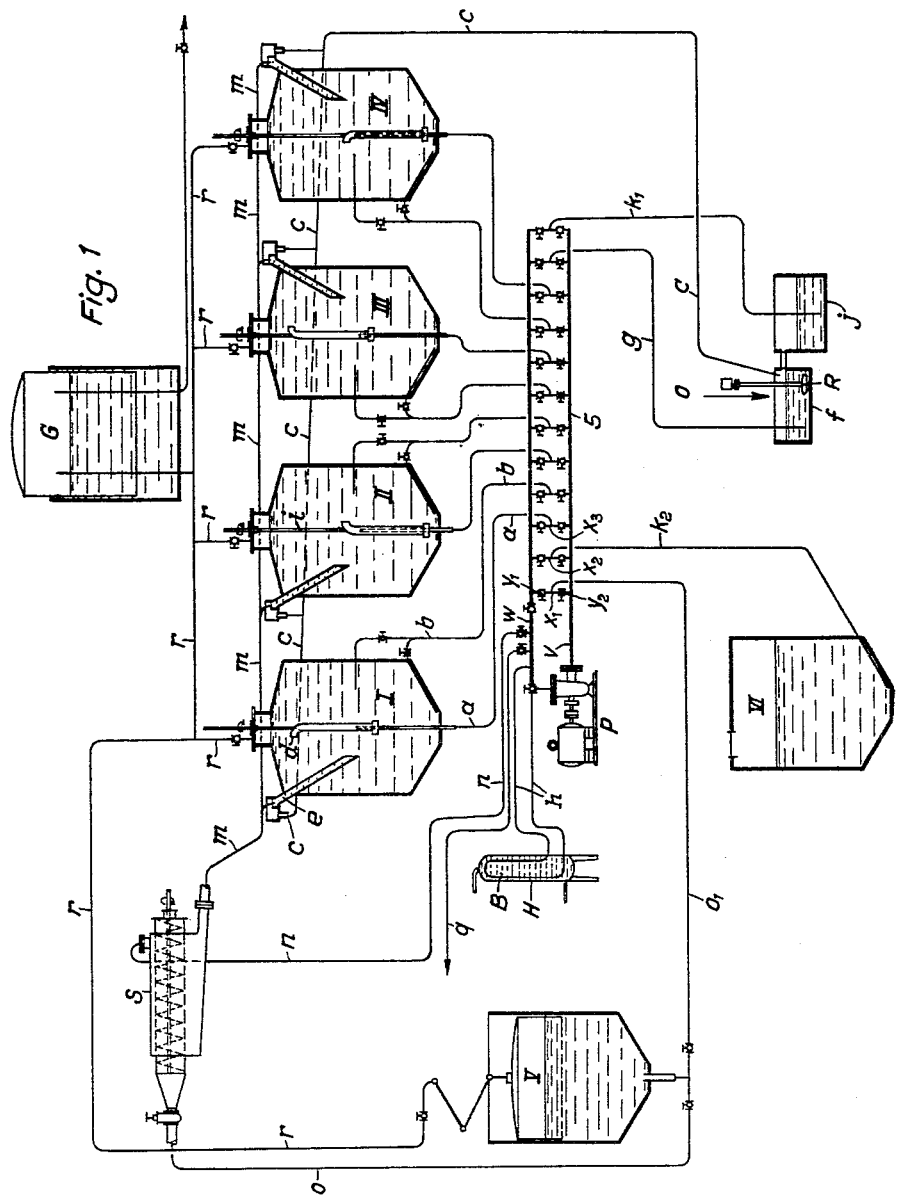

Inventors
Ferdinand SCHMIDT and
Walter EGGERSGLUESS
Attorney

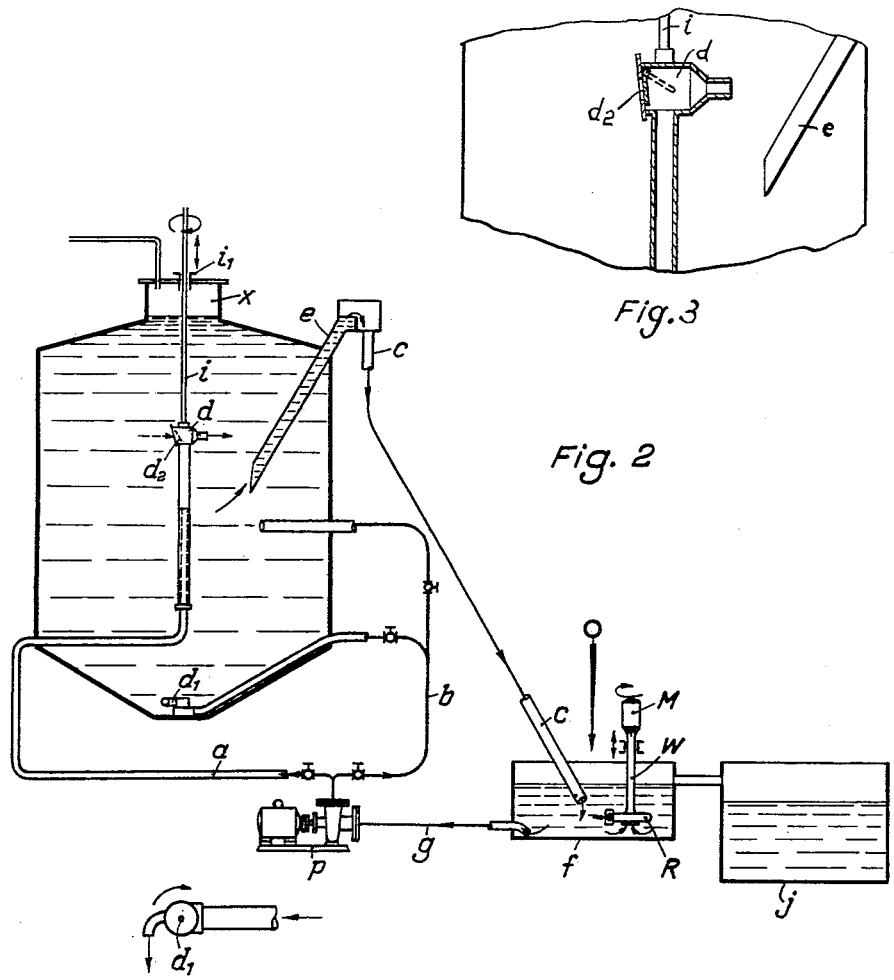

United States Patent Office 2,716,086
Patented Aug. 23, 1955

2,716,086

PROCESS OF AND APPARATUS FOR FERMENTING ORGANIC SUBSTANCES

Ferdinand Schmidt and Walter Eggersgluess, Verden (Aller), Germany

Application June 17, 1950, Serial No. 168,698

Claims priority, application Switzerland June 21, 1949

6 Claims. (Cl. 210—2)

The present invention relates to a process of and apparatus for fermenting organic substances.

It is known that by the process of putrefaction, that is, fermentation, of organic substances of vegetable or animal origin, more especially waste material, faeces and the like, in a so-called fermentation chamber, a combustible gas, known as fermentation gas, can be produced about two-thirds of which consists of methane ($CH_4$). The fermented sludge forms a high-grade fertilizer.

The object of the present invention is to provide an improved process for this purpose and an improved apparatus for carrying it out.

One of the principal disadvantages of the existing processes, which has rendered difficult their employment in agriculture for the economical treatment of liquid manure, excreta, vegetable waste matter and the like, resides in the formation of solid floating layers of sludge by the substances to be fermented in the fermentation chamber, which have a very detrimental effect on the fermentation and gas formation. This advantage is particularly marked when the fermentation chamber is to be charged with a relatively high percentage of solid substances, such as straw, reed or the like, for the purpose of increased economy.

The invention provides a new method of combating such floating layers of sludge which at the same time renders possible a novel and advanced form of charging, heating and discharging the contents of the fermentation chamber.

It is obvious per se to combat the formation of floating layers of sludge by means of agitating mechanisms of suitable construction and of mechanisms which produce a stationary or rotating washing jet. The action of the known arrangements, however, is generally unsatisfactory where a thick solid floating layer is present and it has not hitherto been possible satisfactorily to break up the whole floating layer.

The object of the present invention is to break up the solid floating layer more completely and the invention is characterised in that the loosening of the floating layer of sludge in the fermentation chamber is effected by a vertically movable and rotatable washing stream(s). It is a fact that the floating layer is formed by rising solid particles. This means that the strength or solidity of the floating layer of sludge increases from the bottom upwards. It is therefore more difficult to break up the floating layer from the top than from the bottom. In accordance with the invention this observation is utilised in that the floating layer is preferably broken up from the bottom by means of the rotatable washing jet or stream. During this operation, the washing stream is preferably gradually guided in the upward direction, whereby effective breaking up of the floating layer of sludge is achieved.

The invention also provides apparatus by which such a process can be advantageously carried out, and characterised in that there are provided in such a position as to lie in the contents of the fermentation chamber when charged, washing heads which are adapted to be raised and lowered and at the same time to be rotated or oscillated about a vertical axis, and to which liquid is supplied under sufficiently high pressure that it emerges in the form of the desired outwardly directed washing jet.

The apparatus may be designed to introduce as the washing stream fresh material to be fermented into the fermentation chamber, which is preferably subdivided into a number of separate vessels. The liquid displaced by the washing stream from the fermentation chamber may be returned into the fermentation chamber in order that the thermal energy of this displaced liquid and the methane bacteria contained therein shall not be lost. In general, the fermentation process is carried out at a certain minimum temperature, for example, of about 30° C., which must be maintained as carefully as possible, and the wall of the fermentation chamber may be thermally insulated. Nevertheless, heat losses may occur and may be compensated for by heating. This may be effected by passing the liquid serving to produce the washing jet, for example fermentation chamber liquid, through a suitable heating device before it returns into the fermentation chamber in the form of the washing jet. Finally, the rotating, lowerable and raisable washing heads which serve to produce the washing jet, may be used to discharge the fermented material as well as for the introduction of fresh material. A single central pump installation with a suitable valve device may be employed for carrying out multiple working operations described and necessary for running the plant,—that is, introduction of fresh material, production of the washing jet, circulation of the contents of the fermentation chamber over a heating device and discharge of the completely fermented material.

A suitable form of apparatus according to the invention will hereinafter be described with reference to the embodiment illustrated by way of example in the accompanying drawings, in which:

Fig. 1 is a diagrammatic illustration of a plant according to the invention,

Fig. 2 in a diagrammatic fragmentary illustration shows more clearly the construction of the washing head and a convenient circuit for the fermentation chamber liquid during the introduction of fresh materials, and Fig. 3 is a fragmentary sectional view of a portion of a fermentation vessel illustrating details of the washing head.

According to Fig. 1, the fermentation chamber is subdivided into four cylindrical vessels I, II, III and IV. Thus, in addition to other advantages, the diameter of the individual vessels may be made so small as to give the washing stream hereinafter described a sufficient action from the centre to the peripheral wall of the individual vessels. The walls of these vessels are thermally insulated. Provided in each of the vessels is a washing head $d$ which produces the washing jet for loosening and breaking up the floating layer of sludge. To this end, it is necessary that the washing head should be rotatable and raisable and lowerable in the vertical direction so that it may be guided, during constant rotation, from below to the floating layer of sludge and further upwards while breaking up the said layer. The means employed for this purpose may be constructed in various forms. For example, a pump may be suitably mounted in each of the fermentation vessels, the outlet of the said pump producing the washing jet, the said pump taking up liquid for this purpose from any part, preferably situated at a lower level, of the fermentation vessel. The rotation of the pump may be produced under the reaction of its washing jet or with the aid of an external drive and the pump vertically displaced at the same time.

In the illustrated example, liquid is drawn from the central or lower region of each fermentation vessel through one of the pipes $b$ by means of a central pump P serving for the operation of the whole plant and is forced through the pipe $a$ into a fixed tube introduced centrally into each of the fermentation vessels from below, the said tube rising, for example, to about the centre of the vessel while the washing head $d$ adapted to be raised, lowered and rotated is fitted in telescopic fashion on the said tube.

A convenient construction of such a washing head is shown in Figs. 2 and 3. The washing head has a nozzle-like outlet opening through which the washing stream is discharged radially or helically against the wall of the vessel. At the same time, the washing head has a further wide opening, which is automatically closed by means of a flap valve $d_2$ of non-return type when the washing jet passes through the washing head. If, however, the washing head is used as a suction head for the discharge of the sludge, the flap valve $d_2$ automatically opens and frees a sufficient suction area.

If part of the contents of the fermentation chamber shall be discharged or pumped out, and the distribution system is so arranged that the pump P takes up liquid through the pipe $a$, the flap valve $d_2$ opens automatically so that for the discharge process the large cross section of the head $d$ released by flap valve $d_2$ is further obtained as an addition to the jet opening. When the process of taking up liquid is stopped, the flap valve $d_2$ returns to its closing position by gravity. If liquid is taken up by the pump P and is forced through the pipe $a$ to head $d$ by means of pressure for producing a jet stream, the jet stream can only be issued by the jet opening itself. The flap valve $d_2$ is tightly pressed against the additional intake by means of static hydraulic pressure originating in the jet head so that the said additional intake is safely closed by valve $d_2$.

The raising and lowering movement of the washing head $d$ is produced by a shaft $i$ which at the same time transmits the rotational movement to the washing head. The shaft $i$ is sealed, for example by a stuffing box $i_1$, in the gas dome X. The rotational movement of the washing head may be effected automatically by jet reaction if the washing jet is not discharged radially, but is suitably directed. The raising and lowering movement of the washing head may be effected in any suitable way, for example by a lifting screw consisting of a nut and a spindle or by a set of pulleys, from the top of the vessel, the washing head being simultaneously rotated.

If the floating layer is not very thick, the arrangements according to the invention are suitable for breaking up the floating layer from its centre or even from above.

A corresponding washing and suction head $d_1$ may also be mounted on the bottom of the fermentation vessel (Fig. 2). The rotation of this head is preferably effected by jet reaction. In the pumping in of fresh sludge, for example, this rotation evenly distributes the fresh sludge over the cross-sectional area of the fermentation vessel. This pressure and suction head may also be constructed without a non-return valve for the suction operation. The bottom sludge can be whirled up by the rotating washing jet of this head and then drawn away by the pump. Constructional simplifications are thus also obtained, since, due to the whirling up of the bottom sludge, the bottom of the fermentation vessel need only be slightly inclined as compared with the deep hoppers hitherto necessary.

The apparatus may be designed to circulate the contents of the fermentation vessel and to heat them to, and maintain them at, optimum fermentation temperature, and subsequently discharge the completely fermented sludge for the recovery of humus. For this purpose, there is connected to a distribution battery, as a separate circuit, the heating circuit $h$ by means of which liquid withdrawn from each fermentation vessel, for example through a pipe $b$, can be passed through a heating coil H which is embedded in a heatable water boiler B or is directly washed by heating gases or heated in any other suitable manner. The heated liquid is returned by the pump P into the fermentation vessels and forced through the washing heads $d$.

The apparatus is arranged simultaneously to introduce into each fermentation vessel fresh material which acts as a washing jet and is to be fermented. Preferably liquid from the fermentation vessel is used for the introduction of fresh material, the said liquid being displaced or withdrawn from the fermentation vessels during the delivery of fresh material, and directly or indirectly passed into a mixing vessel from which it is injected through the washing head into the fermentation vessels after having been thoroughly mixed with fresh material for fermentation. A particularly convenient method of carrying out the charging operation according to the invention will be explained with reference to Fig. 2.

A certain quantity of liquid is always situated in the mixing vessel $f$. The organic waste materials O (arrow), which have preferably been previously disintegrated, are projected into this liquid and are mixed energetically with the liquid present by means of an agitating mechanism R arranged in the mixing vessel. The agitating mechanism is driven by a shaft W from the motor M and is suitably movably mounted. It may be raisable and lowerable and rotatable about the axis of the shaft W. The mush thus formed is forced through the pipes $g$ and $b$ (or through the pipe $a$ and the washing head $d$ instead of through one of the pipes $b$) with the aid of the central pump P into each fermentation vessel (I, II, III or IV). The mush displaces an equal volume of liquid, which flows back through the overflow $e$ and the pipe $c$ into the mixing vessel. If the quantity of liquid in the mixing vessel is too great (owing to the additional volume of waste materials introduced) the surplus can be delivered to a collector $j$. The filling operation can thus be performed, for example, by mixing with the circulating liquid from the fermentation vessels, in the mixing vessel, solid substances which, after having been pumped into the fermentation vessels rapidly ascend to the surface and are thus removed from the circuit. Owing to the opening of the overflow deep into the fermentation vessel, only thin sludge can overflow into the mixing vessel whereby the circuit is closed. If the fermentation vessel is not entirely filled, thin sludge, instead of the overflow sludge, can be withdrawn through corresponding pipes, for example pipes $b$, into the mixing vessel or fresh liquid manure or other liquid can be supplied to the mixing vessel for example from the collector $j$.

From time to time, the contents of the vessel $j$ may be pumped by the central pump P through pipes $k_1$, $k_2$ (Fig. 1) into a closed container VI, or used for re-filling the fermentation vessels I, II, III and IV. The mixing vessel itself may also be correspondingly enlarged. The container VI may, if desired, also serve continuously to take up from the fermentation vessels liquid which is displaced during the re-charging of the said vessels with fresh materials for fermentation, in order that this liquid may be available, according to requirement, either for the introduction of fresh fermentation materials into the mixing vessel $f$ or for the re-charging of the fermentation vessels as required. The container VI may also serve to take up waste liquids or substances additionally produced, for example liquid manure, drainage water, faeces and the like, which are to be introduced into the process by reason of the fermentable substances contained therein.

When the contents of one fermentation vessel of the series are completely fermented, the sludge is withdrawn with the aid of the central pump P through a pipe $a$ (in which case the washing head $d$ becomes a suction head) or the lower pipe $b$ (bottom sludge), and forced, for example, through the pipe $n$ to the sludge press S above the fermentation vessel. The liquid pressed off, for example with the exclusion of air by a worm working in a filter cylinder, flows back through the overflow pipe $m$ preferably into that fermentation vessel from which the sludge has just been discharged. By this means, and also by the possible communication (through the battery of distributor cocks 5) between the vessels I, II, III and IV, substantial fluctuations in level in these vessels can be avoided in the discharge of the sludge. The sludge is pressed until a suitable consistency is reached and can then be further treated as required for fertilizing purposes. In the example shown, the sludge still capable of flowing is forced through a pipe $o$ into a liquid manure container V, from which it is discharged with the aid of the central pump P and a pipe $o_1$ and $q$, for example into carriages having sprinkler-like distributors and transported on to the field. In the example, the liquid manure container V serves as an after-fermentation chamber. Gas ducts $r$ collect the gas from all the vessels I to V in a gasometer G.

The operation of pressing the discharged fermentation sludge can be omitted and this discharged sludge passed directly into the liquid manure container V, whence it may be led by way of suitable ducts or vehicles to the field for the purpose of fertilization. In order to bring the sludge to a uniform consistency whereat it is capable of flowing before it is removed from the container V and to homogenise it, an agitating mechanism, for example of the type described with reference to containers I—IV, can be provided in the container V. A similar arrangement may, if desired, also be provided in the container VI. The washing jet arrangements described with reference to the herein described fermentation vessels are also generally suitable for the homogenisation of any other desired physical mixtures of like nature consisting of solid and liquid substances and for combating layers of sludge floating on the surface of such mixtures.

As will be seen from the foregoing description, the distribution system is so constructed that all the pipe lines are connected both to the suction side and to the pressure side of the central circulating pump P and in this way the various working operations can be effected from this central point. Tubes $v$ and $w$ which are connected by a series of transverse tubes $x_1$, $x_2$, $x_3$, etc., may be connected to the suction and pressure sides of the central pump P. To each of these transverse tubes one of the existing pipes $a$, $b$, $g$, $k_1$, $k_2$, etc., is so connected that it can be connected at will either to the pipe $v$ or to the pipe $w$ and thus to the suction or pressure pipe of the pump. This connection is controlled either by two gate valves $y_1$, $y_2$, in each transverse tube $x$ or by three-way cocks, to which the respective pipes and the two limbs of each transverse tube $x$ are connected. The pipes $v$ and $w$ may also be connected by a four-way cock in such a manner that the suction or pressure side of the pump P can be connected according to requirement to the pipes $v$ and $w$, in which case all the transverse tubes with their gate valves may be omitted.

Naturally, many modifications are possible. Since various combinations are possible with the aid of the central pump and distributing arrangement described, it would be possible for example, first to pass substances for fermentation freshly fed by the washing heads through the heating coil H.

The individual fermentation vessels need not be completely filled. The completely fermented sludge is discharged from one vessel at a time in the periodic cycle. One of the vessels preferably that from which the fermented substances have just been discharged, may remain empty or only partly full in order that it may gradually be filled again through the overflows which are displaced during the refilling of the remaining fermentation vessels and are not required as additional liquid for the introduction of fresh substances for fermentation in the mixing vessel. A special additional collecting receptacle corresponding to the container VI may be provided for this excess of liquid. For this purpose the overflows of all fermentation vessels can similarly be connected together and if desired also to an additional collecting receptacle for the overflow liquid and/or to the mixing vessel in such a manner that the overflow liquid of any desired fermentation vessel can flow as required into any other fermentation vessel, into the collecting receptacle, if provided, or into the mixing vessel.

What we claim is:

1. Process of loosening the thick solid floating layer of sludge which forms in the fermentation chamber in the production of methane by the fermentation of agricultural sludge of vegetable or animal origin, which consists in delivering into the material of said layer at least one penetrating jet of liquid in a substantially radial direction from the center region of the fermentation chamber towards the wall thereof and while turning the said jet bodily about an axis moving it vertically through the floating layer and thereby breaking up the said layer.

2. Process of loosening the thick solid floating layer of sludge which forms in the fermentation chamber in the production of methane by the fermentation of agricultural sludge of vegetable or animal origin, which consists in delivering into the said chamber at least one jet of the liquid to be fermented in a substantially radial direction from the center region of the fermentation chamber towards the wall thereof and while turning the said jet bodily about an axis raising it vertically through the layer from below the layer so that it penetrates and breaks up the said layer.

3. An apparatus for the fermentation of agricultural sludge of vegetable or animal origin comprising in combination: a fermentation chamber, at least one nozzle movably arranged in the center region of said chamber for movement in vertical direction and for rotation, a conduit communicating with said nozzle and arranged for leading sludge to be fermented from a supply of sludge to said nozzle, the outlet of said nozzle being arranged for ejecting a jet stream of sludge in a substantially radial direction towards the wall of the chamber, and means connected with said nozzle for causing a simultaneous vertical movement and rotation thereof.

4. An apparatus for the fermentation of agricultural sludge of vegetable or animal origin comprising in combination: a fermentation chamber, at least one nozzle movably arranged in the center region of said chamber, for movement in vertical direction and for rotation, a conduit communicating with said nozzle and arranged for leading sludge to be fermented from a supply of sludge to said nozzle, the outlet of said nozzle being arranged for ejecting a jet stream of sludge in a substantially radial direction towards the wall of the chamber, and means connected with said nozzle for moving same in vertical direction, said nozzle being self-rotating by the reaction of the sludge ejected therefrom during operation whereby a simultaneous rotation and vertical movement of the nozzle is obtained.

5. An apparatus for the fermentation of agricultural sludge of vegetable or animal origin comprising in combination: a fermentation chamber, at least one nozzle movably arranged in the center region of said chamber, for movement in vertical direction and for rotation, means for delivering under pressure fresh sludge to said nozzle, the outlet of said nozzle being arranged for ejecting a jet stream of sludge in a substantially radial direction towards the wall of the chamber, means connected with said nozzle for causing a simultaneous vertical movement and rotation thereof, a mixing vessel, and a conduit connecting said fermentation chamber with said mixing vessel for leading liquid, displaced from the fermentation chamber by said jet stream discharged from said nozzle, to said mixing vessel, said means for delivering fresh sludge to said nozzle being connected to said mixing vessel for drawing fresh material therefrom.

6. An apparatus for the fermentation of agricultural sludge of vegetable or animal origin comprising in combination: a fermentation chamber, at least one nozzle movably arranged in the center region of said chamber, for movement in vertical direction and for rotation, means for delivering liquid under pressure to said nozzle, the outlet of said nozzle being arranged for ejecting a jet stream of sludge in a substantially radial direction towards the wall of the chamber, means connected with said nozzle for causing a simultaneous vertical movement and rotation thereof, and valve means arranged on said nozzle, said valve means being capable of automatic opening by the action of a suction, and said means for delivering liquid to said nozzle being capable of withdrawing sludge past said valve means.

References Cited in the file of this patent

UNITED STATES PATENTS

| | | |
|---|---|---|
| 1,912,595 | Schlenz | June 6, 1933 |
| 2,266,186 | Fischer | Dec. 16, 1941 |
| 2,501,467 | Ittner | Mar. 21, 1950 |
| 2,516,076 | Schlenz | July 18, 1950 |
| 2,520,540 | Green | Aug. 29, 1950 |

FOREIGN PATENTS

| | | |
|---|---|---|
| 445,697 | Great Britain | of 1936 |